United States Patent
Marchant et al.

[11] Patent Number: 6,053,110
[45] Date of Patent: Apr. 25, 2000

[54] AIRBAG GENERANT WAFER DESIGN WITH I-BEAM CONSTRUCTION

[75] Inventors: Brent R. Marchant, Knoxville, Tenn.; Brett Hussey, Bountiful, Utah

[73] Assignee: Autoliv ASP, Inc., Ogden, Utah

[21] Appl. No.: 09/008,002

[22] Filed: Jan. 16, 1998

[51] Int. Cl.[7] .................................................. C06D 5/06
[52] U.S. Cl. ............................................. 102/288; 102/289
[58] Field of Search ..................................... 102/288, 289

[56] References Cited

U.S. PATENT DOCUMENTS

| | | | |
|---|---|---|---|
| 3,886,006 | 5/1975 | Martin et al. | 149/14 |
| 3,895,098 | 7/1975 | Pietz | 423/351 |
| 3,897,285 | 7/1975 | Hamilton et al. | 149/41 |
| 3,901,530 | 8/1975 | Radke | 280/150 AB |
| 3,901,747 | 8/1975 | Garner | 149/42 |
| 4,005,876 | 2/1977 | Jorgensen et al. | 280/741 |
| 4,131,300 | 12/1978 | Radke et al. | 280/737 |
| 4,158,696 | 6/1979 | Wilhelm | 422/166 |
| 4,200,615 | 4/1980 | Hamilton et al. | 422/166 |
| 4,203,787 | 5/1980 | Kirchoff et al. | 149/35 |
| 4,296,084 | 10/1981 | Adams et al. | 423/351 |
| 4,369,079 | 1/1983 | Shaw | 149/2 |
| 4,466,352 | 8/1984 | Dalet et al. | 102/288 |
| 4,547,235 | 10/1985 | Schneiter et al. | 149/35 |
| 4,547,342 | 10/1985 | Adams et al. | 422/166 |
| 4,817,828 | 4/1989 | Goetz | 229/3 |
| 4,890,860 | 1/1990 | Schneiter | 280/741 |
| 4,919,897 | 4/1990 | Bender et al. | 422/165 |
| 4,998,751 | 3/1991 | Paxton et al. | 280/741 |
| 5,019,220 | 5/1991 | Taylor et al. | 264/3.4 |
| 5,101,730 | 4/1992 | Bender et al. | 102/289 X |
| 5,551,343 | 9/1996 | Hock et al. | 102/288 |
| 5,578,787 | 11/1996 | Kobari et al. | 102/289 X |
| 5,847,311 | 12/1998 | Ryder | 102/288 |

*Primary Examiner*—Peter A. Nelson
*Attorney, Agent, or Firm*—Sally J. Brown

[57] ABSTRACT

A gas generant wafer design having a channel region integrally formed into one or both of its sides or faces. Characteristic of the wafer is that the geometric design of the wafer is improved by increasing its cross-section in the same manner that an "I-Beam" increases the structural characteristic of a linear structural member.

16 Claims, 4 Drawing Sheets

AIRBAG GENERANT WAFER DESIGN WITH I-BEAM CONSTRUCTION

CROSS REFERENCE TO RELATED COPENDING APPLICATIONS

This application is related to commonly assigned application Ser. No. 185,535 filed Jan. 21, 1994 now U.S. Pat. No. 5,551,343.

BACKGROUND OF THE INVENTION

1. Field of the Invention

The present invention pertains to pyrotechnic bodies, preferably circular wafers and most preferably washer-shaped discs, made of conventional propellant or gas generant compositions which are fabricated to have a special or unique geometry. The inflator produces a gas which, after filtering out condensed phase products, is preferably used to inflate a gas bag which serves as a vehicle occupant cushion during a collision. More particularly this invention relates to a novel geometry for the generant body wherein a channel region is integrally formed (molded) into one or both side or faces of the body, preferably both.

Even though the generant bodies of this invention are especially designed and suited for creating gas for inflating passive restraint vehicle crash bags, it is to be understood that they would function well in other less severe inflation applications, such as aircraft slides, inflatable boats and inflatable lifesaving buoy devices; would more generally find utility any place a low temperature, non-toxic gas is needed, such as for a variety of pressurization and purging applications as, for example, in fuel and oxidizer tanks of rocket motors; and would be useful as a propellant for recoilless rifles and missile systems, particularly in in-tube rocket motors of the short-burning, high-mass type as disclosed in U.S. Pat. No. 3,886,006.

2. Description of the Prior Art

Automobile gas bag systems have been developed to protect the occupant of a vehicle, in the event of a collision, by rapidly inflating a cushion or bag between the vehicle occupant and the interior of the vehicle. The inflated gas bag absorbs the occupant's energy to provide a gradual, controlled deceleration, and provides a cushion to distribute body loads and keep the occupant from impacting the hard surfaces of the vehicle interior.

The use of such protective gas-inflated bags to cushion vehicle occupants in crash situations is now widely known and well documented.

The requirements of a gas generant suitable for use in an automobile gas bag device are very demanding. The gas generant must have a burning rate such that the gas bag is inflated rapidly (within approximately 150 milliseconds). The burning rate must not vary with long term storage (aging) or as a result of shock and vibration during normal deployment. The burning rate must also be relatively insensitive to changes in humidity and temperature. When pressed into wafers, cylinders, discs or whatever shape, the hardness and mechanical strength of the bodies must be adequate to withstand the mechanical environment to which they may be exposed over the expected inflator system lifetime of at least ten years without any fragmentation or change of surface area. Excessive breakage of the bodies could potentially lead to system failure where, for example, an undesirable high pressure condition might be created within the gas generator device, possible resulting in rupture of the pressure housing.

The gas generant must efficiently produce cool, non-toxic, non-corrosive gas which is easily filtered to remove solid and liquid combustion by-products, and thus preclude damage to the inflatable bag or to the occupant of the automobile.

The requirements as discussed in the preceding paragraphs limit the applicability of many otherwise suitable compositions and shapes thereof from being used in automotive air bag gas generators.

Inflators such as shown in commonly assigned U.S. Pat. Nos. 4,005,876, 4,296,084 and 4,547,342 contain gas generant in the form of pressed pellets or tablets (similar in shape to ALKA-SELTZER® buffered aspirin) which are randomly packed into the inflator combustion chamber. While such an arrangement may be satisfactory for some purposes, the tablets present a high initial surface area for burning and thus do not provide as soft of an inflation onset as may be desired and achieve low volumetric loading fraction due to the volume lost in the interstitial spaces between tablets.

To achieve slower inflation onset and increase volumetric loading fraction, it has been proposed in U.S. Pat. Nos. 3,901,530 and 4,131,300 to form the pyrotechnic combustible material for inflators in the form of separate discs arranged side by side with separator means disposed between adjacent discs to facilitate quick and uniform combustion of the material.

It has been proposed in U.S. Pat. No. 4,200,615 to fabricate a propellant grain from a plurality of washer-shaped discs 26 arrayed side by side on a linear igniter 8 in an inflator combustion chamber.

It has been proposed in U.S. Pat. No. 4,158,696 to press the propellant into wafers and to configure each wafer in a manner to allow space for a propellant powder to be uniformly placed between the wafers to cushion each wafer from shock and vibration and to insure near instantaneous ignition of all wafers. The disposition of propellant powder between the wafers, however, may undesirable result in a fast onset of burning thus producing too high of an initial pressure peak as well as a decreased burn surface neutrality.

More recently it has been proposed in commonly assigned U.S. Pat. Nos. 4,890,860 and 4,998,751 to fabricate an inflator grain by assembling a plurality of washer-shaped propellant wafers or discs in alternating relationship with a plurality of similarly shaped meshed cushion members which are held in compression in the inflator combustion chamber to achieve improved performance.

It is also known from U.S. Pat. No. 4,817,828 that an inflator grain or material may be formed by assembling a plurality of cylindrically shaped grains (FIG. 5), each having an array of axially alignable central and outer peripheral gas passages. The end surfaces of the grains are provided with peripherally located projections (FIGS. 5 and 8) which abut each other thereby acting as standoffs or spacers thus allowing radial gas flow between grains. The plurality of grains require a rather precise and complex assembling operation involving additional features and components to insure proper alignment of the standoff pads and gas passages. This alignment is achieved by placement of a multi-arm retainer device (FIG. 9) about the overall grain which engages V-shaped notches (FIG. 6 and FIG. 7) in the outer sides of each grain. The retainer becomes a permanent part of the inflator.

In FIGS. 5 and 6 of U.S. Pat. No. 4,919,897 it is also known to provide washer-shaped gas generant discs or moldings with projecting knubs or islands on each side whereby a spacer zone (see FIG. 1) is created between stacked disc-shaped moldings thereby attaining improved combustion of the discs. U.S. Pat. No. 5,551,343 discloses a gas generant wafer having a plurality of alike, flat-surfaced projections equally spaced and radially equidistant about the periphery of one or both faces of the wafer.

Current generation flat geometry washers sometimes fracture during handling and processing. This fracturing causes increased scrap and waste. Additionally, the performance of the flat generant wafers is regressive, i.e., the combustion pressure of the inflators using these wafers decreased with burn time. Regressive burning wafers are less desirable because this lowers the average combustion pressure of the inflators, slowing the gas bag inflation down. By utilizing a more neutral burning wafer, the average combustion pressure of the device can be increased, and faster deployment results.

OBJECTS AND SUMMARY OF THE INVENTION

It is therefore an object of the present invention to provide a gas generant body in a configuration that will have superior strength and have excellent combustion and gas flow characteristics when stacked or assembled with other similar bodies into an inflator by virtue of its shape.

Another object of the present invention is to provide a gas generant body which will minimize fracturing during handling and processing.

Another object of the present invention is to provide a gas generant body so configured that it results in a more neutral burning wafer which increases the average combustion pressure of the inflator and provides faster deployment.

Yet another object of the present invention is to provide a gas generant body for an inflator grain assembly having an improved wafer design which will release the same amount of gas and energy from the wafers while decreasing the deployment time of the air bag.

As set forth in greater detail below, the above objectives of the present invention have been achieved in a gas generant body by providing the body with a channel section radially equidistant from the center of wafer on at least one side or face of the body.

In a further specific embodiment of the pellet according to this invention wherein annular channels are located within the topside and/or underside of the pellet, the center for these annular channels lies at or on the axis of the pellet. In this arrangement, the radius of an annular channel on the topside of the pellet can also be different as compared with the radius of the annular channel on the underside. Preferably, however, the annular channels on the topside and underside exhibit identical radii.

The depth and the radii of the annular channels depend on the desired total surface area of the ring pellet which surface area, in turn affects the desired reaction rate.

Characteristic of the wafer embodiment shown in FIG. 1 is that the geometric design of the wafer is improved by increasing its cross-section in the same manner that an "I-Beam" increases the structural characteristics of a linear structural member.

Another important and vital characteristic of the FIG. 1 wafer embodiment is that the improved design also modifies the web of the wafer providing a more neutral performance.

Characteristic dimensions of the preferred wafer embodiment are shown in FIG. 1. It is to be understood that such dimensions are exemplary and that minor changes in the dimensions of the wafer can be employed to alter deployment time without significantly affecting the strength of the wafer.

DETAILED DESCRIPTION OF THE INVENTION

Figure 1:
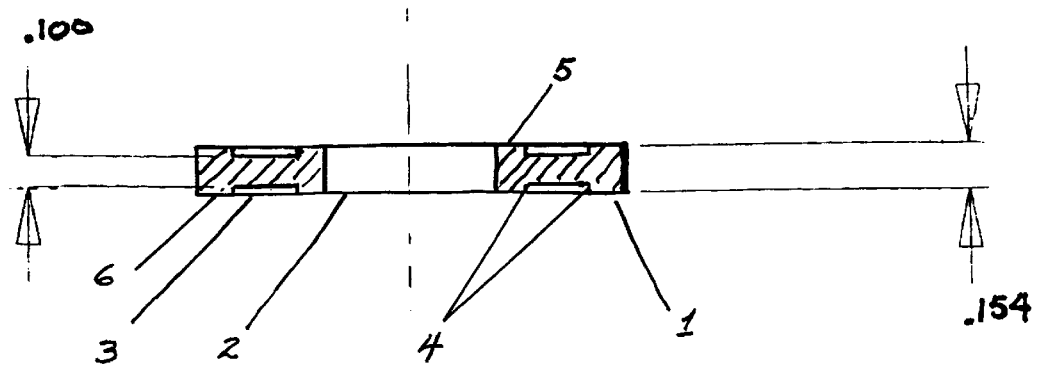
FIG. 1 is a sectional view of the preferred gas generant wafer of the invention.
Figure 2:
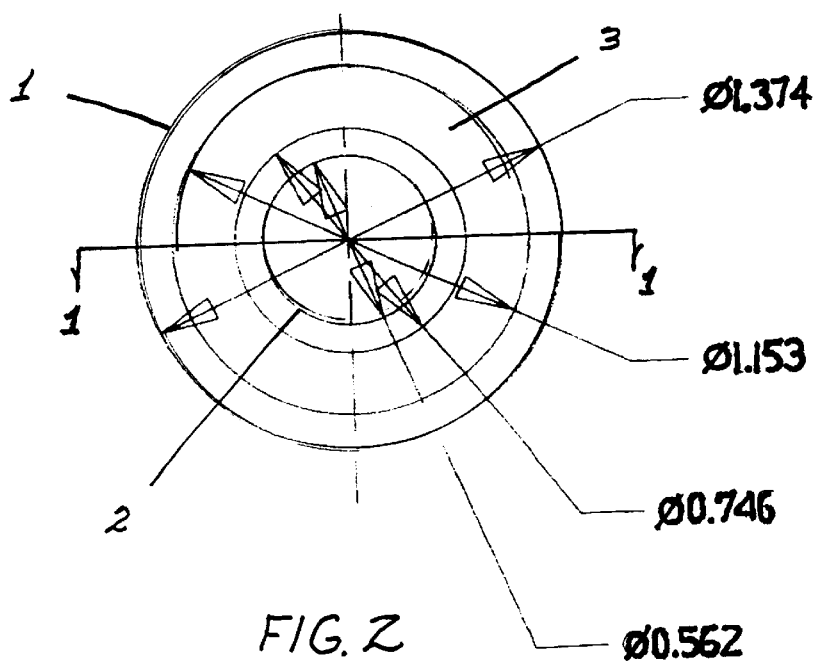
FIG. 2 is a top plan view of the preferred gas generant wafer of the invention.

FIG. 1 shows a preferred embodiment of the improved wafer/disc design having a channel on both faces of the washer shaped disc 1. The washer shaped gas generant disc, FIG. 2, has a diameter of about 1.374 inches and a thickness of about 0.154 inches. Central opening 2 has a diameter of about 0.0562 inches and channels 3 have a width of about 0.2035 inches and a depth of about 0.027 inches.

Such dimensions are exemplary and those skilled in the art will understand that the actual wafer dimensions are determined by particular applications and manufacturer requirements. The unique geometry of the disc increases its cross section and results in an improvement in stiffness and strength in the same manner that an "I-Beam" increases the structural characteristics of a linear structural member. The increase in the cross-section of the wafer brought about by the improved geometric design also provides a more neutral performance. The improved design releases the same amount of gas and energy from the wafer as prior art flat "washer" geometry while decreasing the deployment time of the gas bag. The sides of the wafers can be provided with a camber to facilitate die release.

Figure 3:
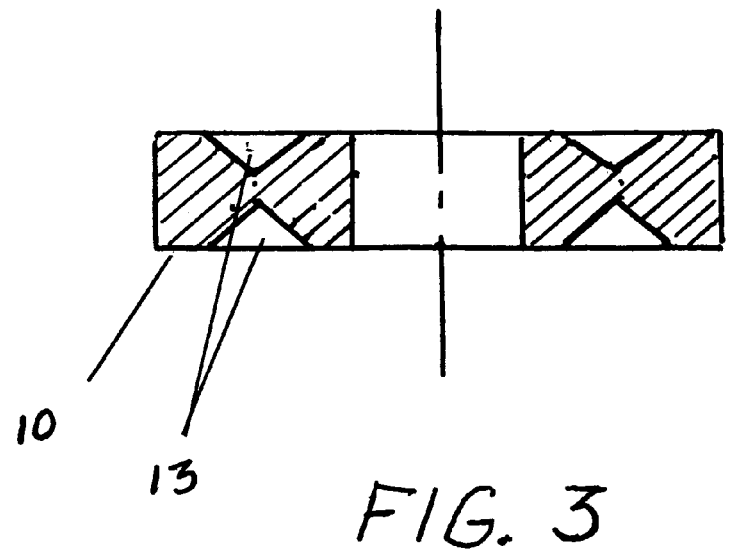
FIG. 3 is a sectional view of a further embodiment of the invention.
Figure 4:
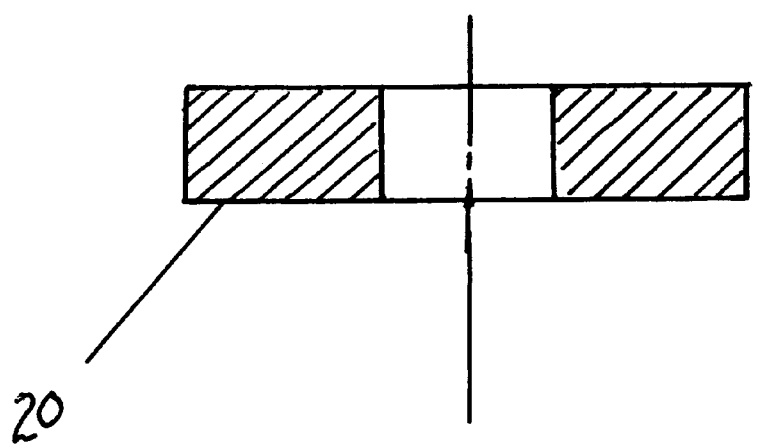
FIG. 4 is a sectional view of a flat prior art gas generant wafer.
Figure 5:
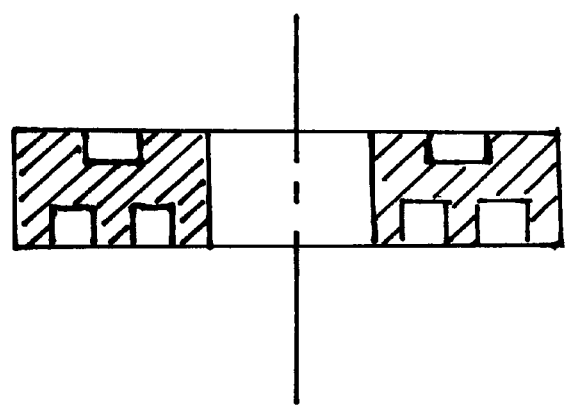
FIGS. 5, 6, 7 and 8 illustrate sectional views of further embodiments of the invention depicting variations in the channel configuration.
Figure 6:
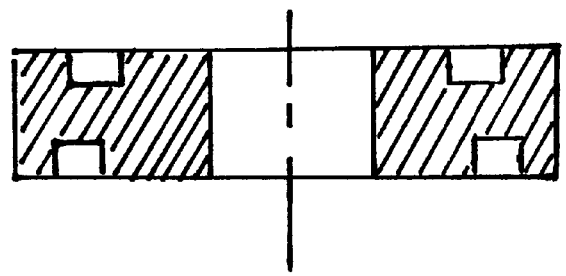
Figure 7:
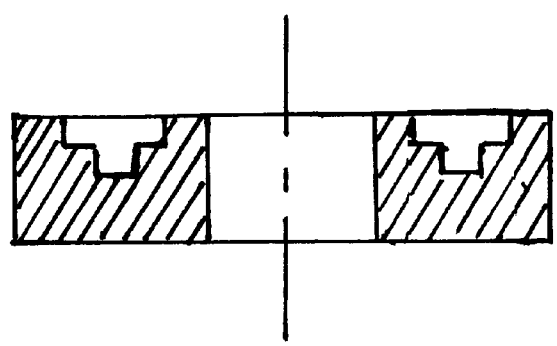
Figure 8:
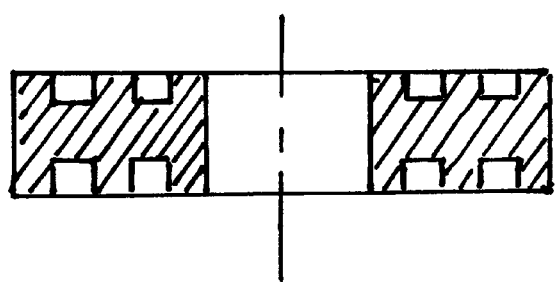

FIG. 3 illustrates another embodiment of the invention wherein wafer 10 has V-shaped channels 13. FIG. 4 illustrates a sectional view of a conventional prior art gas generant flat washer 20.

The channel shaped wafers of the present invention, when tested in like manner with current production flat wafers exhibit a higher moment of inertia about axis (Ixx) and lower deflection values than exhibited by flat wafers. By way of example, a current production 5 gm. wafer having the configuration shown in FIG. 4 would exhibit an Ixx of 0.0586 E-3 and a sigma max.=118 psi. and a delta max.= 0.0132", whereas the inventive 5 gm. wafer of FIG. 1 has an Ixx value of 0.0727=E-3 and a sigma max.=108 psi. and a delta max.=0.0104". Higher Ixx values translate to higher resistance to breakage. Lower sigma (stress) and delta (deflection) values for the inventive wafers translate to a tougher wafer that is less likely to break. These attained physical characteristics for the inventive wafers translate into a stronger/stiffer gas generant wafer compared to current production wafers.

Thus, the improved washer geometry of the invention reduces fracturing during handling and processing and produces a more neutral performance. Thus, the improved washer geometry of the invention not only reduces scrap and waste but also results in a more neutral burning wafer. By utilizing a more neutral burning wafer, the average combustion pressure of the inflator can be increased resulting in faster deployment of the air bag cushion.

FIGS. 5, 6, 7 and 8 illustrate sectional views of gas generant wafers of the present invention comprising embodiments relating to additional channel configurations of the invention. The number and specific geometric configuration of the channels formed in the wafer face(s) can vary as long as the desired strength and burn performance characteristics are maintained.

Figure 9:
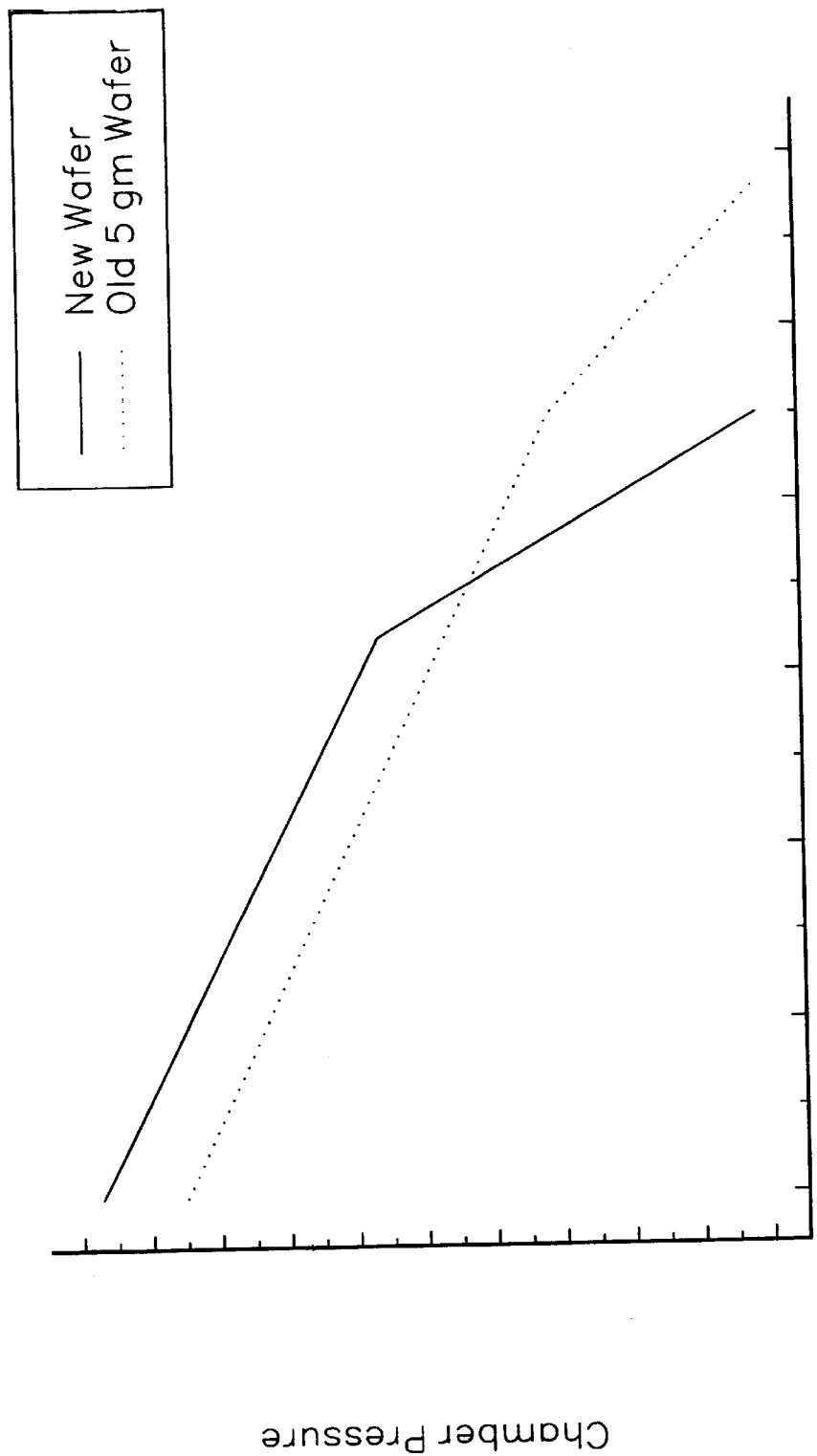
FIG. 9 is a performance curve for the preferred gas generant wafer of the invention compared side by side with a current flat wafer.

FIG. 9 presents a side by side comparison of chamber pressure/time characteristics for the inventive wafers of the present invention and current production flat washers. This illustrates an increase in the average combustion pressure of the device with faster deployment time. The solid line curve represents performance characteristics of 5 gm. wafers of the present invention while the dotted line curve represents performance characteristics of current production flat 5 gm. washers. Thus, FIG. 9 illustrates that the changes in wafer profile of the present invention can be employed to alter deployment time without adversely affecting the strength of the wafer.

Each of the channels are integrally formed into a one piece generant body 1, e.g. by hydraulically or mechanically consolidating or pressing a requisite amount of powdered gas generant composition in a suitably designed die (e.g. steel), as is conventional in the art as disclosed in commonly assigned U.S. Pat. No. 5,019,220 and the art cited therein. The gas generant material may be any known propellant material, for example, any azide or non-azide based composition for automobile gas bag inflators meeting such well known requirements as burning rate, non-toxicity and flame temperature. The generant is preferably an azide based composition. Exemplary azide-based compositions are disclosed in U.S. Pat. Nos. 3,895,098; 4,203,787; 4,547,235 and 5,019,220 and in commonly assigned copending application Ser. No. 07/749,032 file Aug. 23, 1991 and Ser. No. 07/787,500 filed Nov. 4, 1991, and additional art cited therein. Exemplary non-azide based formulations are disclosed in U.S. Pat. Nos. 3,897,285; 3,901,503; 3,901,747 and 4,369,079 and in commonly assigned copending application Ser. No. 07/744,755, filed Oct. 9, 1991, and additional art cited therein.

The bottom surface 7 of each channel 3 shown in FIG. 1 is preferably smooth and flat, i.e. level or parallel to the main surfaces 6 and of the propellant bodies 1. The walls of channels descending from the surfaces and of generant bodies can have almost any shape as long as the bodies (individually and collectively) have sufficient strength and the bodies do not present any significant fabrication difficulties including ease of separation from the die press. FIG. 1 shows an embodiment where walls make a straight drop of 90° angle with the generant face. The walls could descend at an acute or obtuse angle with the face or faces of the wafer body. Walls could also take the form of concave or convex curves or be stepped or tiered or v-shaped.

The generant body 1 is preferably a wafer, more preferably a disc or cylinder and most preferably a washer-shaped disc as shown in the Figures. However, the overall shape of the generant body perimeter, when used in an inflator, is usually dictated by the shape of the combustion chamber in which the bodies are arranged, as similarly shown in aforementioned U.S. Pat. No. 4,890,860. Thus, many other generant body shapes may be used, such as star-shaped or rectangular (preferably a square). And although central holes or openings are preferred, they may be omitted for certain applications, e.g. a solid multi-wafer grain design as disclosed in aforementioned U.S. Pat. No. 4,158,696. Circular shaped openings are most preferred as shown in the Figures. The shape of the opening, however, is usually governed by the shape of the igniter chamber on which the generant bodies are preferably arranged, as similarly shown in U.S. Pat. No. 4,890,860. Thus, such openings may generally take any shape, such as star-shaped or rectangular (square preferred). Also the perimeter wall of the propellant body, as well as central wall of openings (if used), may be saw-toothed or serrated thereby increasing the generant surface area for combustion or to facilitate grain assembly, etc. Further, the perimeter wall[s] of the generant body can be provided with a slight camber to facilitate removal from the compaction die.

With this description of the invention in detail, those skilled in the art will appreciate that various modifications may be made to the invention without departing from the spirit thereof. Therefore it is not intended that the scope of the invention be limited to the specific embodiments illustrated and described. Rather it is intended that the invention scope be determined by the appended claims and their equivalents.

What is claimed is:

1. A gas generant body of gas releasing material in the form of a disc having inner and outer edges and with top and bottom surfaces extending between said inner and outer edges, said top and bottom surfaces having a channel formed therein, wherein said channel is aligned to said top and bottom and is of such a dimension in said top and bottom surfaces that it creates an I-beam structure in cross section thereby increasing the structural characteristics of said body.

2. The gas generant body of claim 1 wherein the disc is in the form of a washer.

3. The gas generant body of claim 2 wherein the disc is circular and the channel formed therein is concentric with said inner and outer edges.

4. The gas generant body of claim 3 wherein the gas releasing material is an azide.

5. A gas generant body of gas releasing material in the form of a disc having inner and outer edges and with top and bottom surfaces extending between said inner and outer edges, at least one of said top and bottom surfaces having a channel formed therein wherein said channel is aligned to said top and bottom and is of such a dimension in said top and bottom surfaces that it creates an I-beam structure in cross section thereby increasing the structural characteristics of said body and wherein said channel has a V-shaped cross section.

6. A solid wafer body for gas generators formed of a gas releasing material said wafer comprising an interior portion with top and bottom surfaces and a continuous outer rim or boundary portion surrounding said interior portion, said interior portion having a continuous channel formed in at least one of its top and bottom surfaces wherein said channel is aligned to said top and bottom and is of such a dimension in said top and bottom surfaces that it creates an I-beam structure in cross section thereby increasing the structural characteristics of said body and wherein said channel has a V-shaped cross section.

7. The gas generant body of claim 3 wherein said channel has a constant cross section.

8. The gas generant body of claim 3 wherein said channel has a nonlinear cross section.

9. A solid wafer body for gas generators formed of a gas releasing material, said wafer comprising an interior portion with top and bottom surfaces and a continuous outer rim or boundary portion surrounding said interior portion, said interior portion having a continuous channel formed in its top and bottom surfaces wherein said channel is aligned to said top and bottom and is of such a dimension in said top and bottom surfaces that it creates an I-beam structure in cross section thereby increasing the structural characteristics of said body.

10. A wafer body according to claim 9 wherein said wafer includes a central, axially symmetrical opening extending therethrougn and said continuous channel is arranged between said central opening and said outer rim of said wafer.

11. A wafer body according to claim 9 wherein the wafer is disc shaped and said channel is annular.

12. A wafer body according to claim 11 wherein there is a like number of annular channels on the top and bottom surfaces of said wafer.

13. A wafer body according to claim 11 wherein said annular channels on the top and bottom are aligned.

14. A wafer body according to claim 11 wherein said annular channels on the top and bottom are offset.

15. A wafer body according to claim 11 wherein the number of said channels on the top and bottom are different.

16. A wafer body according to claim 4 wherein the gas releasing material is an azide.

* * * * *